United States Patent [19]
Tabata et al.

[11] Patent Number: 5,873,426
[45] Date of Patent: Feb. 23, 1999

[54] HYBRID VEHICLE DRIVE SYSTEM HAVING MEANS FOR USING AT LEAST ENGINE AS DRIVE POWER SOURCE IN SPECIAL VEHICLE OPERATING STATE, TO ASSURE SUFFICIENT DRIVE FORCE

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 826,824

[22] Filed: Apr. 8, 1997

[30] Foreign Application Priority Data

Apr. 4, 1996 [JP] Japan .................................. 8-089764

[51] Int. Cl.⁶ ...................................................... B60K 1/00
[52] U.S. Cl. ............................................. 180/65.7; 477/2
[58] Field of Search ..................... 180/65.1, 65.2, 180/65.3, 65.4, 65.6, 65.7, 338; 477/2, 3, 4, 5, 7, 15, 34

[56] References Cited

U.S. PATENT DOCUMENTS

| | | | |
|---|---|---|---|
| 5,509,491 | 4/1996 | Hall, III | 180/65.7 |
| 5,704,440 | 1/1998 | Urban et al. | 180/65.7 |
| 5,713,425 | 2/1998 | Buschhaus et al. | 180/65.7 |
| 5,775,449 | 7/1998 | Moroto et al. | 180/65.7 |

FOREIGN PATENT DOCUMENTS

B2-61-58694  12/1986  Japan .
A-7-67208   3/1995  Japan .

*Primary Examiner*—Richard M. Camby
*Attorney, Agent, or Firm*—Oliff & Berridge, PLC

[57] ABSTRACT

Hybrid drive system for a motor vehicle, wherein an automatic transmission disposed between a drive wheel of the vehicle and a drive power source including an engine and an electric motor is controlled by a shift control device, to change the speed ratio according to a normal shift pattern in a normal vehicle operating state, and according to a special shift pattern in a predetermined special vehicle operating state such that the speed ratio according to the special shift pattern is smaller than the speed ratio according to the normal shift pattern, and wherein at least the engine is selected by a substitute drive power source selecting device, as the drive power source for driving the vehicle in the special operating state in which the automatic transmission is controlled according to the special shift pattern.

9 Claims, 11 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| | 2nd | ● | ○ | | | | | | ● | ○ | | | 2.180 |
| | 3rd | ○ | ○ | | | ● | | ○ | | ○ | | | 1.424 |
| | 4th | ○ | ○ | ○ | | | ○ | | | ○ | ○ | | 1.000 |
| | 5th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
| --- | --- | --- | --- | --- | --- |
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

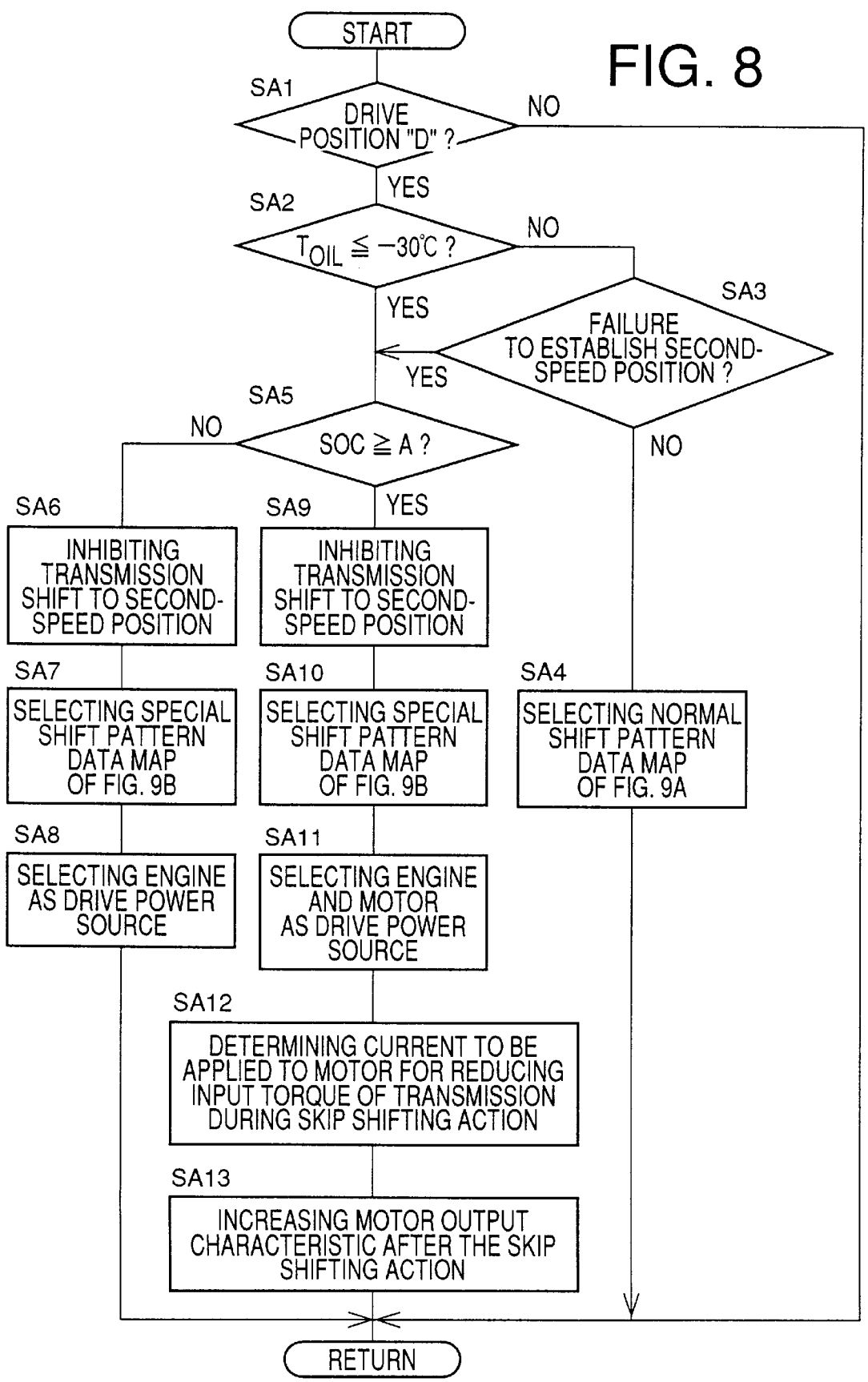

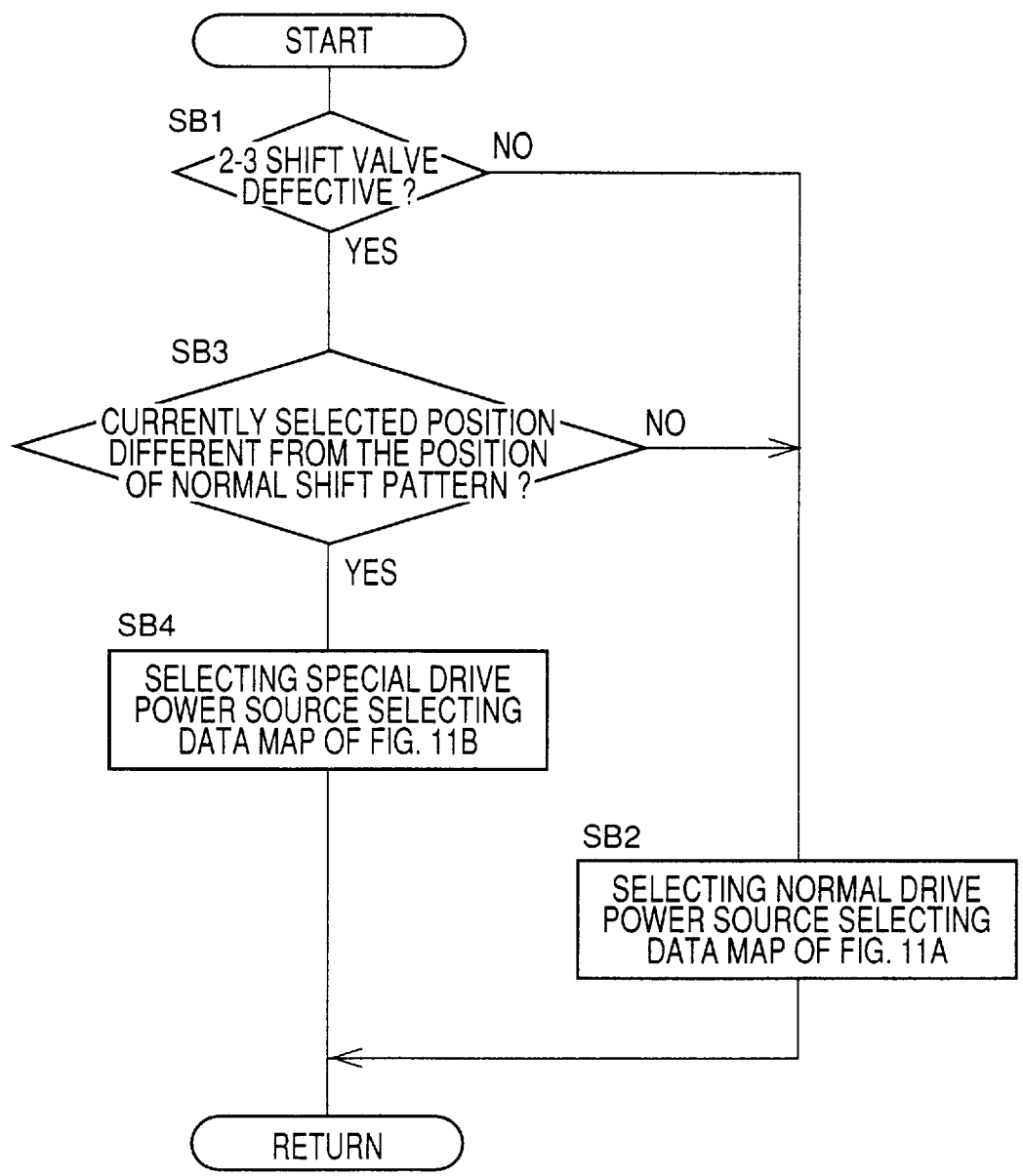

HYBRID VEHICLE DRIVE SYSTEM HAVING MEANS FOR USING AT LEAST ENGINE AS DRIVE POWER SOURCE IN SPECIAL VEHICLE OPERATING STATE, TO ASSURE SUFFICIENT DRIVE FORCE

This application is based on Japanese Patent Application No. 8-89764 filed Apr. 4, 1996, the content of which is incorporated hereinto by reference.

BACKGROUND OF THE INVENTION

1. Field of the Invention

The present invention relates in general to a hybrid drive system for a motor vehicle, which has shift control means for controlling an automatic transmission to change its speed ratio, according to a predetermined normal shift pattern determined to drive the motor vehicle with an optimum drive force, in a normal operating state of the vehicle, and according to a predetermined special shift pattern in a predetermined special operating state of the vehicle such that the speed ration of the automatic transmission controlled according to the special shift pattern is smaller than the speed ratio controlled according to the normal shift pattern. More particularly, the present invention is concerned with techniques for assuring a sufficient vehicle drive force in the special operating state in which the automatic transmission is controlled according to the special shift pattern.

2. Discussion of the Related Art

An example of such a hybrid vehicle drive system is disclosed in JP-A-7-67208, which includes as a drive power source an engine operated by combustion of a fuel and an electric motor operated with an electric energy a drive power, and an automatic transmission disposed between the drive power source and a drive wheel of the vehicle.

A hybrid vehicle drive system has different operating modes which are selectively established so as to minimize the fuel consumption and exhaust gas emissions. For instance, the operating modes include: an engine drive mode in which only the engine is used as the drive power source; a motor drive mode in which only the electric motor is used as the drive power source; an engine-motor drive mode in which both the engine and the electric motor are used as the drive power source; and an engine drive and charging mode in which the motor vehicle is driven by the engine while the electric motor is operated by the engine as an electric generator or dynamo, for charging an electric energy storage device which is provided to store an electric energy used by the electric motor to drive the motor vehicle.

The automatic transmission provided in such a hybrid vehicle drive system may be an automatic transmission having a plurality of operating positions having respective different speed ratios (input speed/output speed), which are selectively established by selective engagement and disengagement of clutches and brakes. Alternatively, the automatic transmission may be a continuously variable transmission whose speed ratio is continuously variable. The hybrid drive system has shift control means for controlling the automatic transmission to change its speed ratio, so as to drive the vehicle with an optimum drive force, according to a predetermined normal shift pattern on the basis of suitable parameters such as an operating amount of an accelerator pedal and a running speed of the vehicle. This normal shift pattern is used in the normal operating state of the vehicle, without a failure associated with the shifting of the automatic transmission.

The automatic transmission may fail to establish a given operating position due to a failure or defect of a solenoid-operated shift control valve or any other component. To cope with this failure, it is proposed to arrange the shift control means so that the automatic transmission is controlled according to a predetermined special shift pattern in a special operating state of the vehicle, namely, when a given operating position of the automatic transmission cannot be correctly established. According to the special shift pattern, the speed ratio of the automatic transmission is controlled to be smaller than that determined according to the normal shift pattern. An example of this type of shift control means is disclosed in JP-B-61-58694.

Where the second-speed position of the automatic transmission cannot be established, for example, the automatic transmission cannot be shifted up from the first-speed position to the second-speed position, and cannot be shifted down from the third-speed position to the second-speed position. In this case, the automatic transmission controlled according to the special shift pattern is shifted up from the first-speed position to the third-speed position whose speed ratio is smaller than that of the second-speed position, even when the automatic transmission should be shifted to the second-speed position according to the normal shift pattern. Alternatively, the automatic transmission controlled according to the special shift pattern remains in the third-speed position, even when the automatic transmission should be shifted down to the second-speed position according to the normal shift pattern. Since the second-speed position cannot be established when the automatic transmission should be shifted up or down to the second-speed position, the drive force for driving the motor vehicle tends to be insufficient when the automatic transmission is controlled according to the special shift pattern in the special operating state of the vehicle (i.e., upon some failure of the transmission). Namely, the transmission is undesirably shifted up from the first-speed position directly to the third-speed position even when the running condition of the vehicle (operation amount of the accelerator pedal and the vehicle running speed) requires the transmission to be shifted to the second-speed position, or alternatively, undesirably remains in the third-speed position even when the running condition of the vehicle requires the transmission to be shifted down from the third-speed position to the second-speed position. Thus, the vehicle drive force is likely to be insufficient according to the special shift pattern.

The above problem is also encountered where the automatic transmission is a continuously variable transmission.

SUMMARY OF THE INVENTION

It is therefore an object of the present invention to provide a hybrid drive system for a motor vehicle, which assures a sufficient vehicle drive force even when the automatic transmission is controlled according to a special shift pattern in a special operating state of the vehicle, for example, upon failure of the transmission to establish a given operating position.

The above object may be achieved according to the principle of the present invention which provides a hybrid drive system for a motor vehicle, comprising: (a) an electric energy storage device for storing an electric energy; (b) a drive power source including an electric motor operated with the electric energy supplied from the electric energy storage device, and an engine operated by combustion of a fuel, at least one of the electric motor and the engine being operated for driving the motor vehicle in a plurality of operation modes; (c) an automatic transmission which is disposed between the drive power source and a drive wheel of the motor vehicle and whose speed ratio is variable; (d) shift control means for controlling the automatic transmission to change its speed ratio, according to a predetermined normal shift pattern determined drive the motor vehicle with an optimum drive force, in a normal operating state of the motor vehicle, and according to a predetermined special shift pattern in a predetermined special operating state of the motor vehicle such that the speed ratio of the automatic transmission controlled according to the special shift pattern is smaller than the speed ratio of the automatic transmission according to the normal shift pattern; and (e) substitute drive power source selecting means for selecting at least the engine as the drive power source for driving the motor vehicle in the predetermined special operating state of the motor vehicle in which the automatic transmission is controlled according to the special shift pattern.

In the hybrid drive system of the present invention constructed as described above, the substitute drive power source selecting means is adapted to select at least the engine as the drive power source for driving the motor vehicle in the predetermined special operating state of the motor vehicle in which the automatic transmission is controlled by the shift control means according to the special shift pattern, which causes the automatic transmission to be controlled to have a smaller speed ratio than when the automatic transmission is controlled according to the normal shift pattern. Usually, the engine provided in the hybrid drive system provides a larger drive force than the electric motor, the motor vehicle can be driven with a larger drive force in the predetermined special operating state of the vehicle according to the present invention, than where the vehicle is driven by only the electric motor in the special operating state. Therefore, the present hybrid drive system permits the vehicle to be driven with a sufficient drive force even when the automatic transmission is controlled according to the special shift pattern which causes the automatic transmission to be controlled to have a smaller speed ratio than when it is controlled according to the normal shift pattern. Of course, both the engine and the electric motor may be used as the drive power source for driving the motor vehicle in the special operating state of the vehicle.

In a first preferred form of the present invention, the engine has a maximum torque larger than a maximum torque of the electric motor, and the substitute drive power source selecting means is adapted to select only the engine as the drive power source for driving the motor vehicle in the predetermined special operating state.

In a second preferred form of the invention, the substitute drive power source selecting means is adapted to select both the engine and the electric motor as the drive power source for driving the motor vehicle in the predetermined special operating state. In the present arrangement wherein the engine and the electric motor are both used to drive the vehicle in the special operating state, the hybrid drive system assures a larger vehicle drive force in the special operating state, than when the vehicle is driven by only one of the electric motor and the engine. In the present preferred form of the invention, the maximum torque of the electric motor may be larger than that of the engine.

The automatic transmission may be a planetary gear type or a parallel two-axes type having a plurality of operating positions having respective different speed ratios, which are selectively established by selective engagement and disengagement of frictional coupling devices such as clutches and brakes, or positive or claw clutches. The automatic transmission may be a continuously variable transmission of a belt-and-pulley type or toroidal type, whose speed ratio is continuously variable.

In a third preferred form of the present invention, the shift control means controls the automatic transmission according to the special shift pattern where the automatic transmission cannot be normally shifted to any one of drive positions thereof having respective different speed ratios cannot be normally established. For example, the shift control means may be adapted to control the automatic transmission according to the special shift pattern where any one of the drive positions of the automatic transmission cannot be correctly established due to abnormality associated with the shifting of the automatic transmission, such as a structural or functional failure or defect of a solenoid-operated shift control valve for shifting the automatic transmission. Alternatively, the shift control means may be adapted to control the automatic transmission according to the special shift pattern where the automatic transmission should be inhibited from being shifted to any one of drive positions thereof having respective different speed ratios. The shift control means may also be adapted to control the automatic transmission according to the special shift pattern where a temperature of an oil used for operating the automatic transmission is lower than a predetermined lower limit. When the oil temperature is excessively low, the hydraulically shifting response of the automatic transmission is deteriorated, and the automatic transmission is likely to suffer from an undesirable shifting shock, particularly when the automatic transmission undergoes a clutch-to-clutch shifting action of the automatic transmission, from a second-speed position to a third-speed position, for example. The clutch-to-clutch shifting action is effected by engaging one of two coupling devices while releasing the other coupling device. The deteriorated hydraulically shifting response of the automatic transmission also causes a shifting shock where the automatic transmission is shifted by controlling an engagement force of a coupling device depending upon the input torque of the transmission.

In the present hybrid drive system, the engine or both the engine and the electric motor is/are used as the drive power source for driving the vehicle in the predetermined special operating state, for example, in an abnormal operating state of the automatic transmission, as described above, in which the automatic transmission is controlled according to the special shift pattern. However, the selection of at least the engine as the drive power source in the special operating state does not necessarily result in a sufficient vehicle drive torque, but permits an increase in the maximum drive torque provided by the drive power source in the special operating condition. In other words, the operator should depress the accelerator pedal by an amount sufficient to permit the selected drive power source (engine, or both engine and electric motor) to provide a sufficient drive torque. In this respect, it is desirable that the hybrid drive system further comprises output increasing means for increasing an output of the drive power source which is selected by the substitute drive power source selecting means in the predetermined special operating state of the motor vehicle, so that the output of the drive power source in the predetermined special operating state is larger than that of the drive power source in the normal operating state. For instance, where the substitute drive power source selecting means selects both the engine and the electric motor as the drive power source for driving the motor vehicle in the predetermined special operating state, the output increasing means may be adapted to increase an output of the electric motor in the predetermined special operating state of the motor vehicle.

The principle of the present invention is applicable to various types of hybrid drive system equipped with the engine and the electric motor as the drive power source for driving the motor vehicle. At least one of the engine and the electric motor may be used as the drive power source, by selective connection and disconnection of appropriate power transmission paths by selective engagement and disengagement (releasing) of clutches, or by a synthesizer and distributor mechanism such as a planetary gear mechanism for synthesizing or distributing the outputs of the engine and electric motor, or by suitable means for using the electric motor as an auxiliary drive power source to assist the engine as a primary power source.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 7 is a view indicating nine operating modes which are selectively established in the sub-routine of FIG. 6;

FIG. 8 is a flow chart illustrating a control operation of the hybrid drive system of FIG. 1, which is characteristic of the first embodiment of the invention;

FIG. 10 is a flow chart illustrating a control operation of the hybrid drive system, which is characteristic of a second embodiment of the invention.

DETAILED DESCRIPTION OF THE PREFERRED EMBODIMENTS

Figure 1:
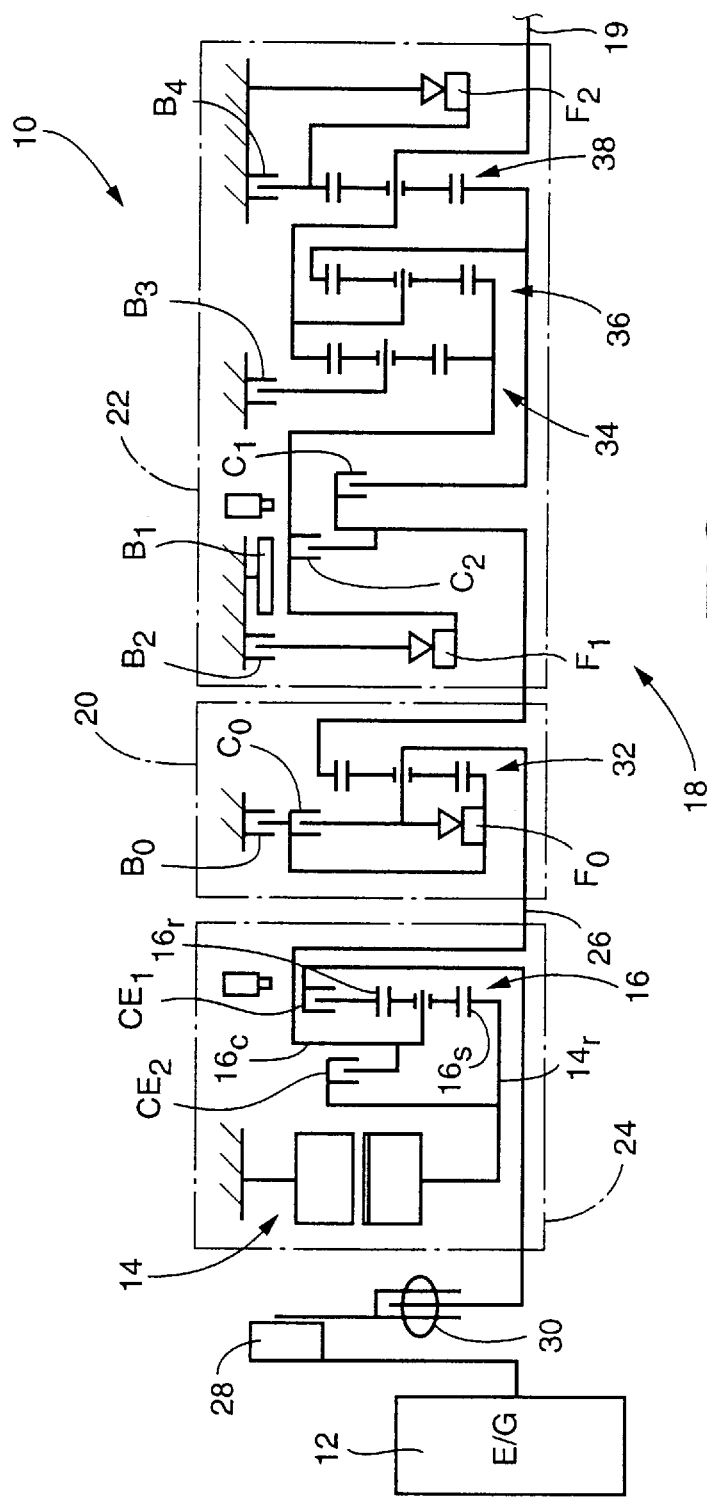
FIG. 1 is a schematic view illustrating a general arrangement of a hybrid drive system constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2.

Figure 2:
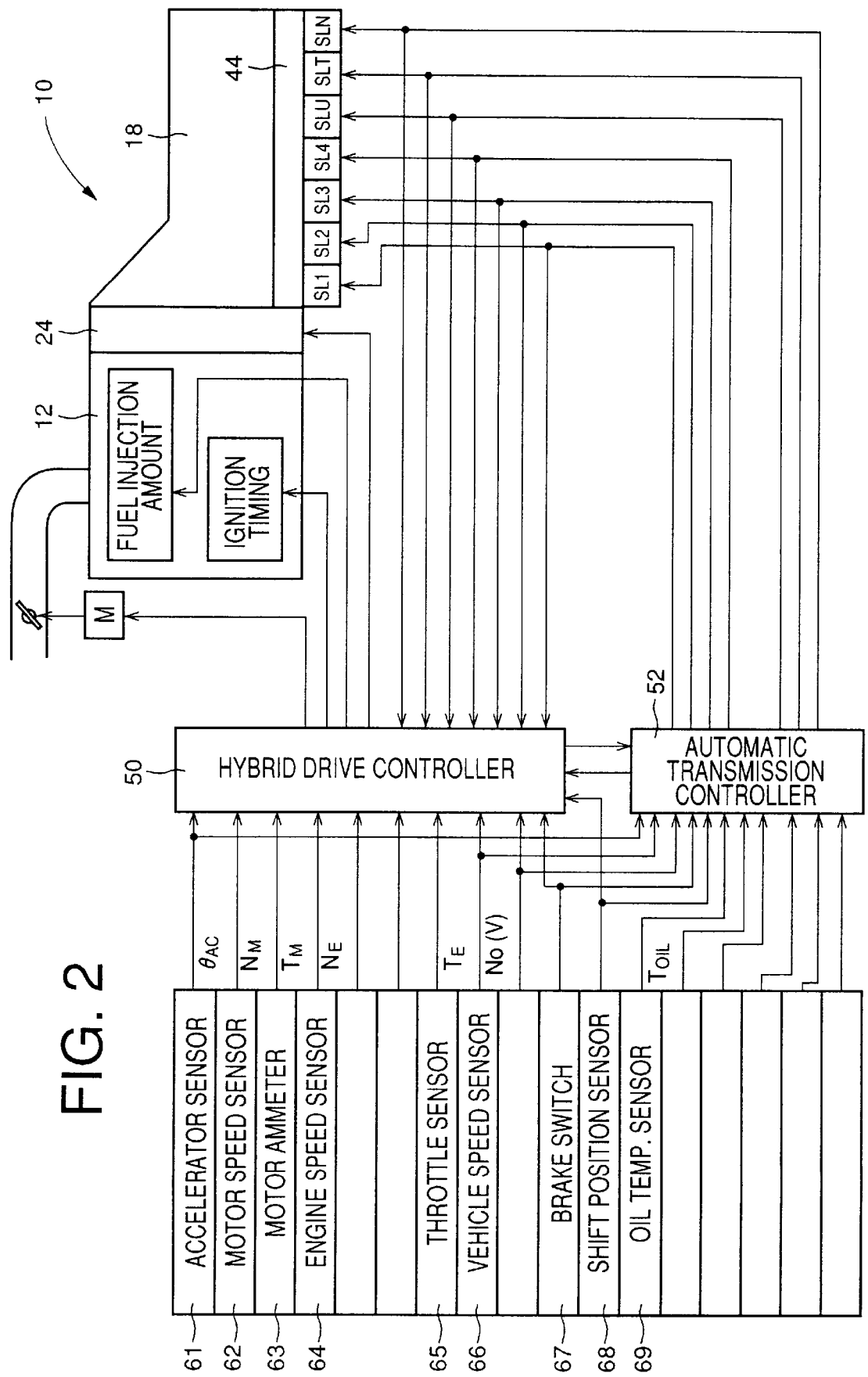
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle.

The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $1/(1+\rho)$.

The rear-drive position "Rev" of the automatic transmission 18 has a speed ratio $i_R$ which is equal to $1-1/\rho_2\cdot\rho_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 44 is constructed as described below by reference to FIG. 4.

Figure 4:
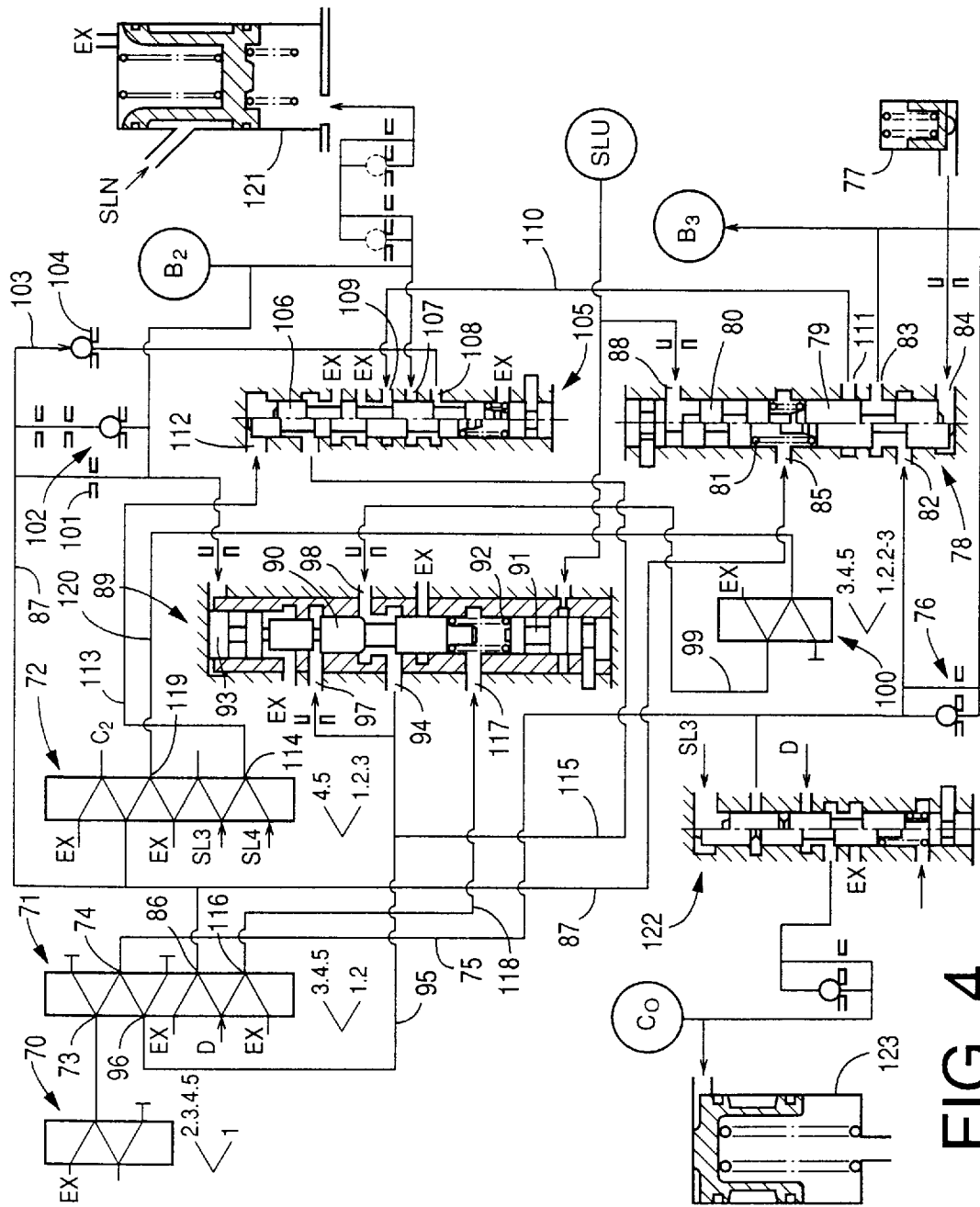
FIG. 4 is a view showing a part of a hydraulic system of the automatic transmission in the hybrid drive system of FIG. 1.

In FIG. 4, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2-3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2-3 timing valve which includes a spool 90, a first plunger 91, a spring 92 disposed between the spool 90 and the first plunger 91, and a second plunger 93 disposed on the side of the spool 90 remote from the first plunger 91. the spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 08 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 4 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases.

Reference numeral 122 in FIG. 4 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, the engaging pressure of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 4, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure of the third brake B3 during its releasing action is controlled by the linear solenoid valve SLU on the basis of an input torque of the input shaft 26 of the automatic transmission 18 which is estimated prior to the shift-up action.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting speed $N_O$ of the output shaft 19 of the automatic transmission 18, which indicates running speed V of the motor vehicle; a brake switch 67 for detecting an operation of a brake pedal; a shift position sensor 68 for detecting the currently selected position of the shift lever; and an oil temperature sensor 69 for detecting a temperature $T_{OIL}$ of an oil in the hydraulic control device 44.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 5:
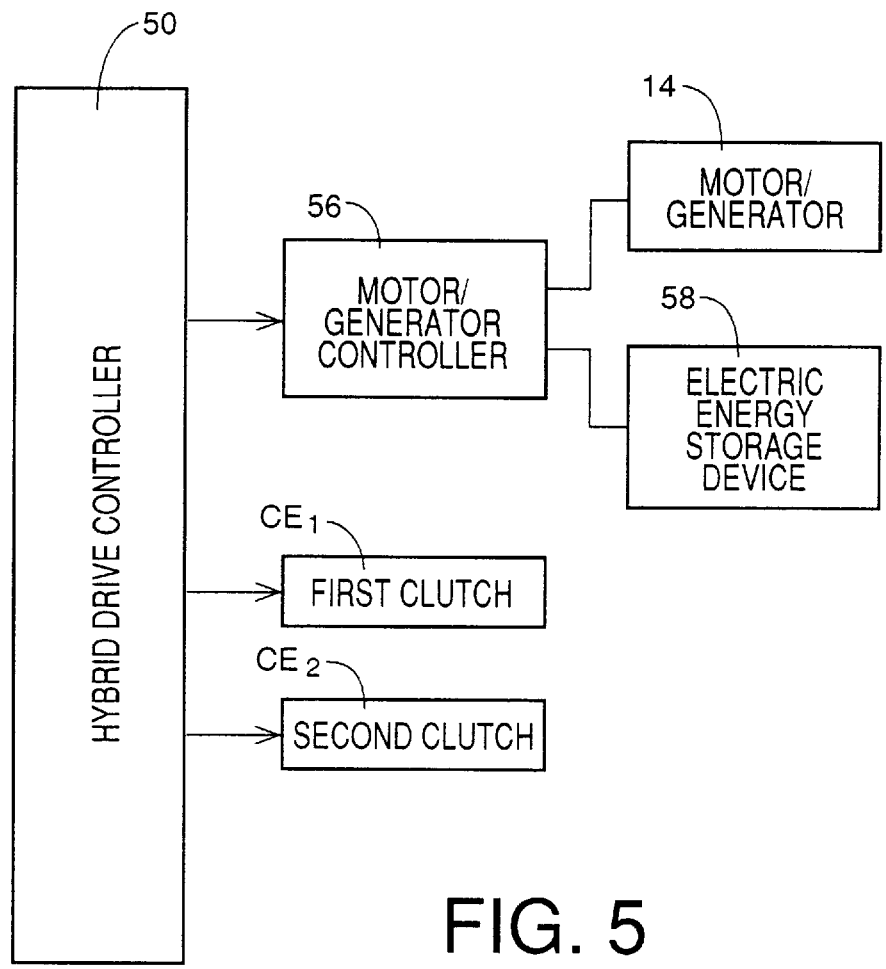
FIG. 5 is a block diagram showing connection between a hybrid drive controller and an electrically operated torque converter shown in FIG. 1.

The motor/generator 14 is connected to an electric energy storage device 58 through a motor/generator controller 56, as indicated in FIG. 5. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 252 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns.

Figure 6:
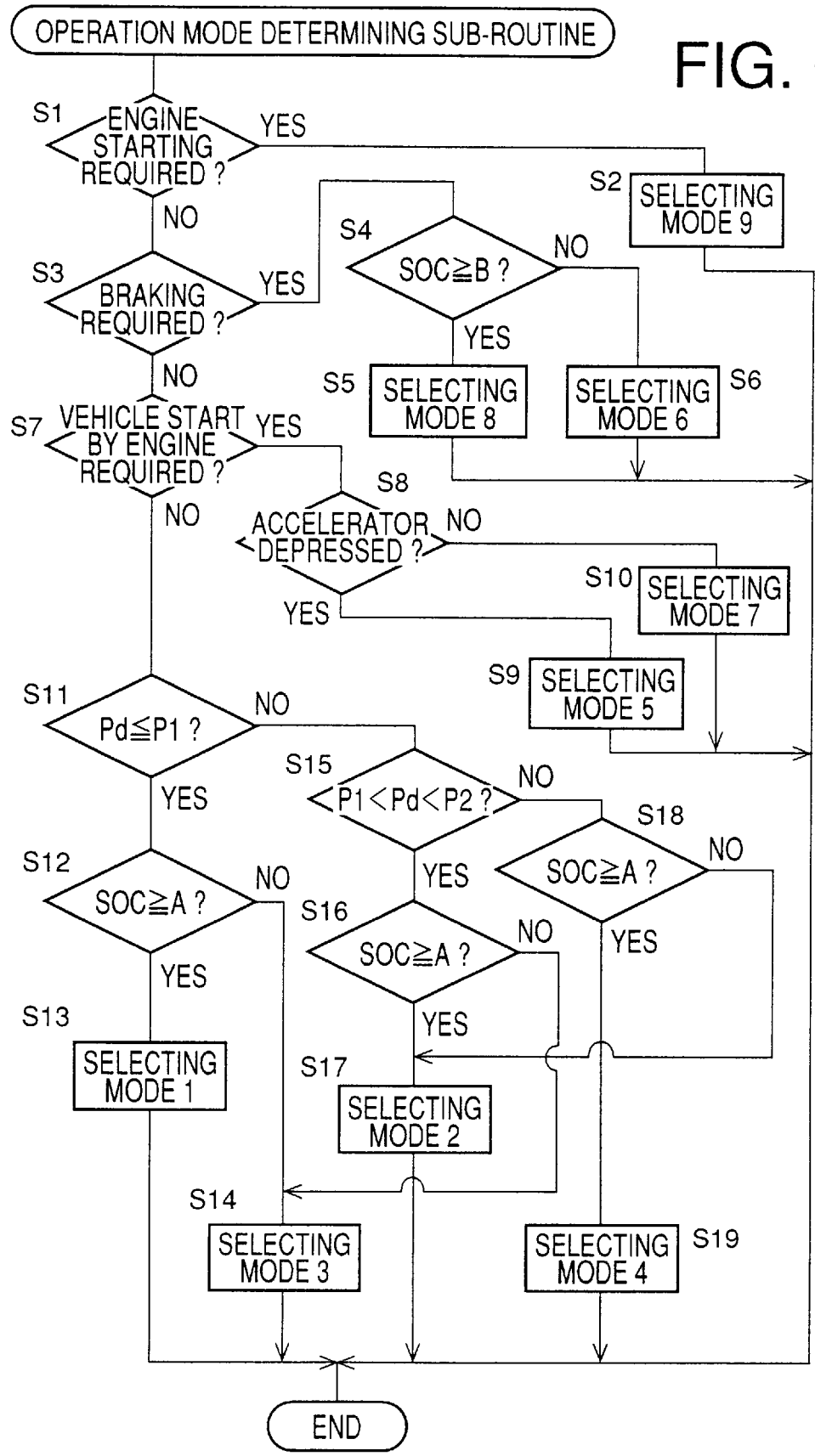
FIG. 6 is a flow chart illustrating an operation mode determining sub-routine executed by a hybrid drive controller of the hybrid drive system of FIG. 1.

The hybrid drive controller 50 is adapted to execute an operation mode determining sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above.

The engine torque $T_E$ can be obtained from the opening of the throttle valve as detected by the throttle sensor 65, or from the amount of fuel injection into the engine 12. The motor torque $T_M$ can be obtained from the electric current of the motor/generator 14 as detected by the motor ammeter 265. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 6 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 7, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 7, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are $1:(1+\rho E):\rho E$, where $\rho E$ represents a gear ratio of the planetary gear device 16 ($\rho$=number of teeth of the sun gear 16s divided by number of teeth of the ring gear 16r). When the gear ratio $\rho E$ is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as $(1+\rho E)/\rho E$ times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is $(1+\rho)$ times the engine torque $T_E$.

The motor/generator 14 used in the hybrid drive system 10 of the present embodiment has a torque capacity which is about $\rho E$ times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 7, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 7, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 7, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

The hybrid drive controller 50 and the automatic transmission controller 52 are adapted to execute a routine illustrated in the flow chart of FIG. 8, for controlling the vehicle, so as to prevent an insufficient vehicle drive force when the automatic transmission is controlled according to a special shift pattern, in place of a normal shift pattern, due to some trouble with the automatic transmission. In the specific example which will be described, the special shift pattern is used where the second-speed position of the automatic transmission 18 cannot be established, or where the oil temperature of the hydraulic control device 44 is excessively low.

Figure 9A:
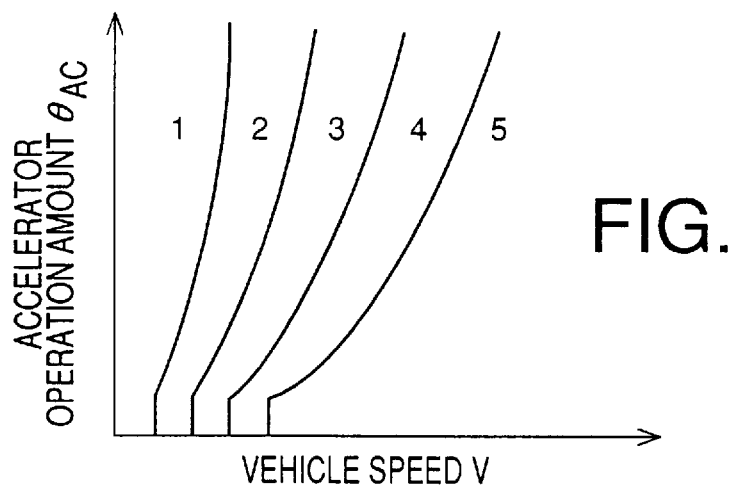
FIGS. 9A, 9B and 9C are views showing shift pattern data maps which are used in the control operation of FIG. 8, for shifting the automatic transmission on the basis of an operating amount $\theta_{AC}$ of an accelerator pedal and a running speed V of the vehicle, the data map of FIG. 9A being a normal data map, the data map of FIG. 9B being formulated to inhibit shifting of the automatic transmission to its second-speed position, and the data map of FIG. 9C being formulated to inhibit shifting of the automatic transmission to the first-speed and second-speed positions.
Figure 9B:
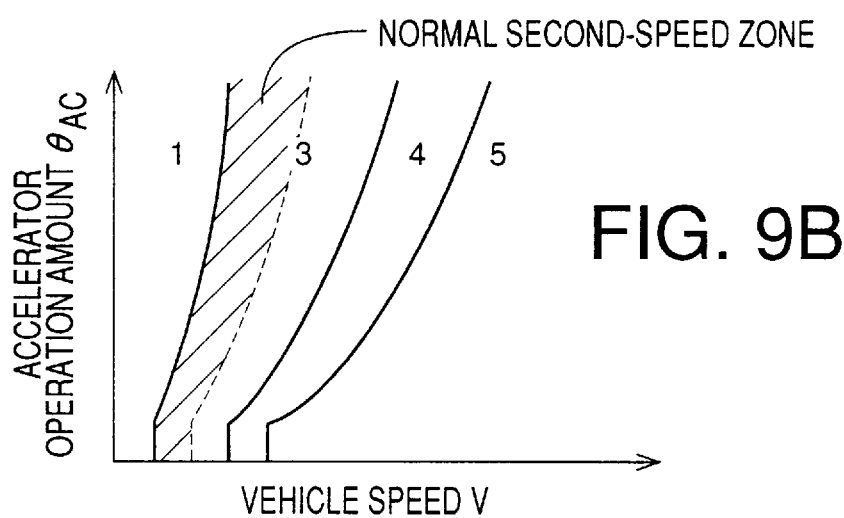

When the automatic transmission 18 is normal and the oil temperature of the hydraulic control device 44 is not excessively low, the automatic transmission 18 is controlled to change its speed ratio according to the normal shift pattern as represented by a normal shift pattern data map as indicated in FIG. 9A, depending upon the running condition of the vehicle, namely, on the basis of the operating amount $\theta_{AC}$ of the accelerator pedal and the running speed V of the vehicle. When the automatic transmission 18 is not normal, that is, when the second-speed position cannot be established, or when the oil temperature of the hydraulic control device 44 is excessively low, the automatic transmission 18 is controlled according to a special shift pattern represented by a special shift pattern data map as indicated in FIG. 9B. According to the special shift pattern of FIG. 9B, the automatic transmission 18 cannot be shifted up from the first-speed position "1st" to the second-speed position "2nd" even when the automatic transmission 18 should be shifted up to the second-speed position according to the normal shift pattern of FIG. 9A. In this case, the automatic transmission 18 controlled according to the special shift pattern is shifted up from the first-speed position "1st" directly to the third-speed position "3rd".

Further, the automatic transmission 18 controlled according to the special shift pattern of FIG. 9B cannot be shifted down from the third-speed position "3rd" to the second-speed position "2nd" even when the automatic transmission 18 should be shifted to the second-speed position according to the normal shift pattern of FIG. 9A. In this case, the automatic transmission 18 controlled according to the special shift pattern remains in the third-speed position.

Hatched area in FIG. 9B indicates a zone which corresponds to the second-speed position according to the normal shift pattern of FIG. 9A. This zone will be referred to as "normal second-speed zone".

The routine of FIG. 8 is initiated with step SA1 to determine whether the shift lever is placed in the drive position "D". This determination is effected on the basis of the output signal of the shift position sensor 68. If a negative decision (NO) is obtained in step SA1, one cycle of execution of the routine is terminated. If an affirmative decision (YES) is obtained in step SA1, the control flow goes to step SA2 to determine whether the temperature $T_{OIL}$ of the oil in the hydraulic control device 44 is equal to or smaller than a lower limit of −30° C. The determination in step SA2 is effected on the basis of the output signal of the oil temperature sensor 69.

If a negative decision (NO) is obtained in step SA2, it means that the oil has a sufficient degree of fluidity, and the hydraulically shifting response of the automatic transmission 18 is not excessively low. In this case, the control flow goes to step SA3 to determine whether the automatic transmission 18 fails to establish the second-speed position "2nd", or fails to perform a clutch-to-clutch shifting action, for example, a clutch-to-clutch shifting action from the second-speed position "2nd" to the third-speed position "3rd" or vice versa. This determination can be effected, for instance, by determining whether the 2-3 shift valve 71 or any other component for performing the shifting action is defective, as disclosed in JP-A-5-157167.

If a negative decision (NO) is obtained in step SA3, namely, if the automatic transmission 18 does not fail to establish the second-speed position "2nd", the control flow goes to step SA4 to select the predetermined normal shift pattern represented by the normal shift pattern data map indicated in FIG. 9A, by way of example. In this case, the operation mode of the hybrid drive system 10 is selected according to the operation mode determining sub-routine of FIG. 6.

If an affirmative decision (YES) is obtained in step SA3, that is, if the automatic transmission 18 fails to establish the second-speed position "2nd", the control flow goes to step SA5 to determine whether the electric energy amount SOC stored in the electric energy storage device 58 is equal to or larger than a lower limit A.

If a negative decision (NO) is obtained in step SA5, it means that the electric energy amount SOC stored in the storage device 58 is not enough for permitting the motor/generator 14 to be used as the drive power source. In this case, the control flow goes to step SA6 to inhibit an operation to shift the automatic transmission 18 to its second-speed position "2nd", and to step SA7 to select the special shift pattern represented by the special shift pattern data map as indicated in FIG. 9B, by way of example.

Step SA7 is followed by step SA8 to select the operation mode 2 (engine drive mode) for driving the motor vehicle by the engine 12, if the vehicle running condition as represented by the operating amount $\theta_{AC}$ of the accelerator pedal and the running speed V falls in the normal second-speed zone indicated by the hatched area in FIG. 9B. In this case, the engine drive mode 2 whose maximum torque is larger than that of the motor/generator 14 is selected irrespective of the operation mode selected according to the operation mode determining sub-routine of FIG. 6. Namely, the engine 12 is selected as the drive power source, for the purpose of preventing a shortage of the vehicle drive force which would take place if only the motor/generator 14 were selected as the drive power source. When the second-speed position "2nd" of the automatic transmission 18 cannot be established even when the vehicle running condition is in the normal second-speed zone, the vehicle drive force produced by only the motor/generator 14 tends to be insufficient because the automatic transmission 18 is shifted up from the first-speed position "1st" directly to the third-speed position "3rd" even when the automatic transmission 18 should be shifted up to the second-speed position according to the normal shift pattern, or remains in the third-speed position even when the automatic transmission should be shifted down from the third-speed position to the second-speed position according to the normal shift pattern.

According to the special shift pattern of FIG. 9B, the automatic transmission 18 may undergo a so-called skip shifting action from the first-speed position to the third speed position, or vice versa. In this case, the automatic transmission 18 may suffer from an undesirably large shifting shock of the transmission, unless the torque $T_E$ of the engine 12 is reduced prior to the skip shifting action. Therefore, it is desirable to sufficiently reduce the engine torque $T_E$ (input torque of the automatic transmission 18) prior to the skip shifting action, by retarding the ignition timing of the engine 12 or by reducing the engine torque per the operating amount $\theta_{AC}$ of the accelerator pedal. Where the temperature of the engine is too low to permit the engine torque reduction by retarding the ignition timing, the engine torque is desirably reduced by an electronically controlled throttle valve. In view of the response of the electronically controlled throttle valve, the maximum engine torque may be limited, for example. Further, to compensate for a shortage of the vehicle drive force after the skip shifting action of the automatic transmission 18 to the third-speed position "3rd", for example, it is desirable that the output of the engine 12 with respect to the operation amount $\theta_{AC}$ of the accelerator pedal be increased by suitable output increasing means. This output increasing means may be adapted to control the engine 10 as the substitute drive power source, so as to increase the output of the engine 12 for each operating amount $\theta_{AC}$ of the accelerator pedal.

If an affirmative decision (YES) is obtained in step SA5, that is, if the electric energy amount SOC stored in the storage device 58 is equal to or larger than the lower limit A, it means that the motor/generator 14 can be used as the drive power source. In this case, the control flow goes to step SA9 to inhibit an operation to shift the automatic transmission 18 to its second-speed position "2nd", and to step SA10 to select the special shift pattern represented by the special shift pattern data map of FIG. 9B. Step SA10 is followed by step SA11 to select the operation mode 4 (engine-motor drive mode) for driving the motor vehicle by both the engine 12 and the motor/generator 14, if the vehicle running condition (represented $\theta_{AC}$ and V) falls in the normal second-speed zone indicated by the hatched area in FIG. 9B. In this case, the engine-motor drive mode 4 is selected irrespective of the operation mode selected according to the operation mode determining sub-routine of FIG. 6. That is, the engine 12 and the motor/generator 14 are both used as the drive power source, for preventing a shortage of the vehicle drive force which would otherwise take place, due to the failure of the automatic transmission 18 to establish the second speed position "2nd" even when the vehicle running condition is in the normal second-speed zone.

Step SA11 is followed by step SA12 in which the electric current to be applied to the motor/generator 14 in the engine-motor drive mode is determined so as to reduce the input torque of the automatic transmission 18, for thereby preventing a shifting shock in the skip shifting action (e.g., 1→3 shift-up action) of the automatic transmission 18. Then, the control flow goes to step SA13 to increase the output of the motor/generator 14 per the operation amount $\theta_{AC}$ of the accelerator pedal when the vehicle running condition is in the normal second-speed zone indicated by hatching in FIG. 9B, after the skip shifting action.

It will be understood from the above description that a portion of the automatic transmission controller 52 assigned to implement steps SA2–SA4, SA6–SA7 and SA9–SA10 constitutes shift control means for controlling the automatic transmission 18 to change its speed ratio, according to the predetermined normal shift pattern of FIG. 9A to drive the motor vehicle with a desired or optimum drive force, in a normal operating state of the vehicle, and according to the predetermined special shift pattern of FIG. 9B in a predetermined special operating state of the vehicle such that the speed ratio of the automatic transmission controlled in the special operating state according to the special shift pattern is smaller than the speed ratio of the automatic transmission controlled in the normal operating state according to the normal shift pattern. It will also be understood that a portion of the hybrid drive controller 50 assigned to implement steps SA8 and SA11 constitutes substitute drive power source selecting means for selecting at least the engine 12 as the drive power source in the predetermined special operating state of the vehicle in which the automatic transmission is controlled according to the special shift pattern.

In the present embodiment, steps SA2–SA4, SA6–SA7 and SA9–SA10 are formulated so that the speed ratio of the automatic transmission 18 controlled according to the special shift pattern data map of FIG. 9B upon failure of the automatic transmission to establish the second-speed position "2nd" is smaller than the speed ratio controlled according to the normal shift pattern data map of FIG. 9A. Further, steps SA8 and SA11 are formulated to select the engine 12 or both the engine 12 and the motor/generator 14 as the drive power source, upon failure of the automatic transmission to establish the second-speed position. Therefore, the hybrid drive system 10 according to the present embodiment of the invention is prevented from suffering from an insufficient vehicle drive force, which would be caused if only the motor/generator 14 is used as the drive power source upon failure of the automatic transmission 18.

The present embodiment is also adapted to inhibit the shifting of the automatic transmission 18 to the second-speed position when the temperature of the oil in the hydraulic control device 44 is lower than the predetermined lower limit. This arrangement prevents a shifting shock of the automatic transmission 18, which would occur due to low hydraulically shifting response thereof due to low fluidity of the oil if the automatic transmission 18 were shifted from the first-speed position to the second speed position, or from the second-speed position to the third-speed position, for example. In these shifting actions, the hydraulic pressure to the appropriate coupling device or devices should be properly regulated with high response.

Figure 11A:
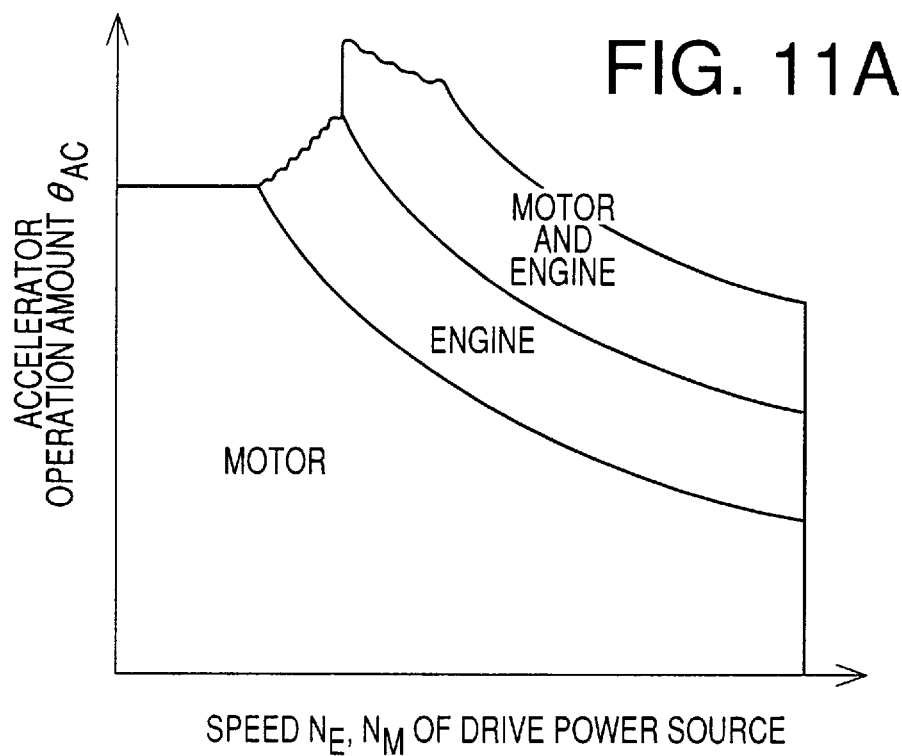
FIGS. 11A and 11B are views showing drive power source selecting data maps which are used in the control operation of FIG. 10, for selecting the drive power source on the basis of the operating amount $\theta_{AC}$ of the accelerator pedal and the operating speed ($N_E$, $N_M$) of the drive power source, the data map of FIG. 11A being a normal data map, and the data map of FIG. 11B being a special data map formulated to prevent an insufficient vehicle drive force upon skip shifting of the automatic transmission.
Figure 11B:
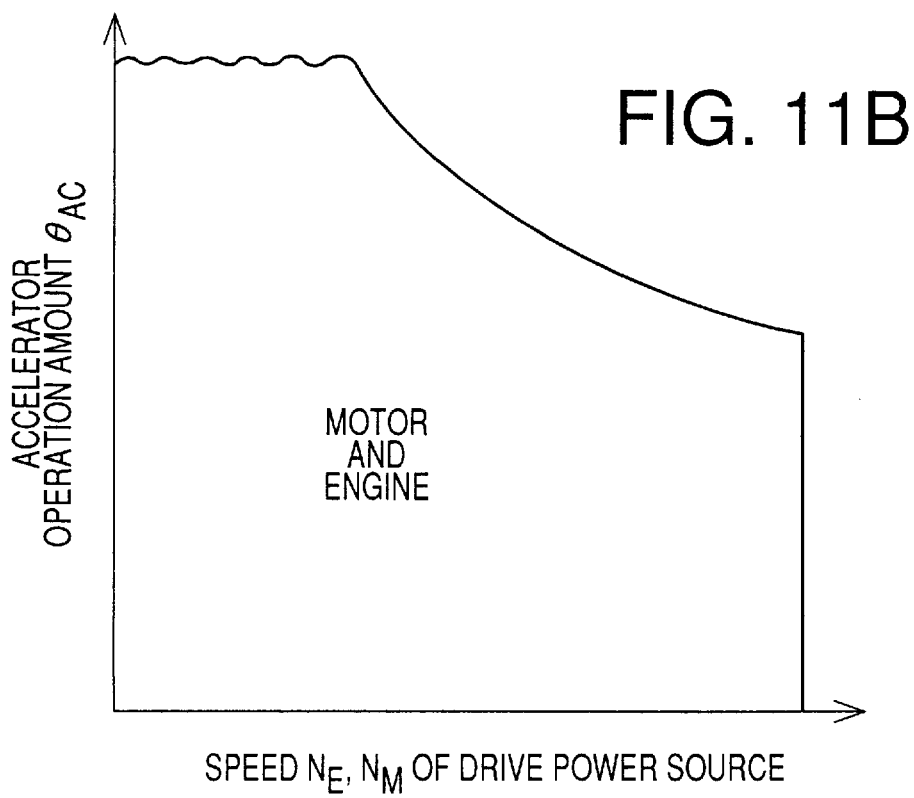

Referring to FIGS. 10, 11A and 11B, there will be described a second embodiment of the present invention, in which the hybrid drive controller 50 is adapted to execute a routine illustrated in the flow chart of FIG. 10, which is formulated to prevent an insufficient vehicle drive force when the automatic transmission 18 is controlled according to the special shift pattern.

The routine of FIG. 10 is initiated with step SB1 to determine whether the automatic transmission 18 fails to normally operate to perform any shifting action. For instance, step SB1 is formulated to determine whether the 2-3 shift valve 71 is defective. This determination may be effected as disclosed in JP-A-5-157167.

If a negative decision (NO) is obtained in step SB1, the control flow goes to step SB2 to select the drive power source according to a normal drive power source selecting data map as indicated in FIG. 11A. When this drive power source selecting data map is selected, only the motor/generator 14, only the engine 12, or both the motor/generator 14 and the engine 12 is/are selected as the drive power source, on the basis of the operating amount $\theta_{AC}$ of the accelerator pedal and the operating speed $N_E$, $N_M$ of the currently selected drive power source.

If an affirmative decision (YES) is obtained in step SB1, the control flow goes to step SB3 to determine whether the currently established position of the automatic transmission 18 is different from the position that is to be selected according to the normal drive power source selecting data map of FIG. 11A. If a negative decision (NO) is obtained, the control flow goes to step SB2 to select the drive power source according to the normal drive power source selecting data map of FIG. 11A.

If an affirmative decision (YES) is obtained in step SB3, the control flow goes to step SB4 to select the drive power source according to a special drive power source selecting data map as indicated in FIG. 11B. that is, both the motor/generator 14 and the engine 12 are selected as the drive power source, irrespective of the operation amount $\theta_{AC}$ and the speed $N_E$, $N_M$ of the drive power source.

If the affirmative decision (YES) is obtained in step SB1, that is, if any drive position of the automatic transmission 18 cannot be established due to the 2-3 shift valve or any other component, for example, the special shift pattern of FIG. 9B is selected to shift the automatic transmission to a position whose speed ratio is smaller than that of the position selected according to the normal shift pattern of FIG. 9A, as in the first embodiment. If the second-speed position "2nd" cannot be established, the third-speed position "3rd" is established when the running condition of the vehicle falls in the normal second-speed zone.

It will be understood that a portion of the hybrid drive controller 50 assigned to implement step SB4 constitutes substitute drive power source selecting means for selecting both the engine 12 and the motor/generator 14 as the drive power source, in a special operating state of the vehicle, namely, when any drive position of the automatic transmission 18 cannot be established. Thus, the present second embodiment is also effective to prevent an insufficient vehicle drive force even when the automatic transmission 18 is shifted according to the special shift pattern, to the position whose speed ratio is smaller than that of the position according to the normal shift pattern.

While the present invention has been described above in its presently preferred embodiments by reference to the accompanying drawings, it is to be understood that the invention may be otherwise embodied.

Figure 9C:
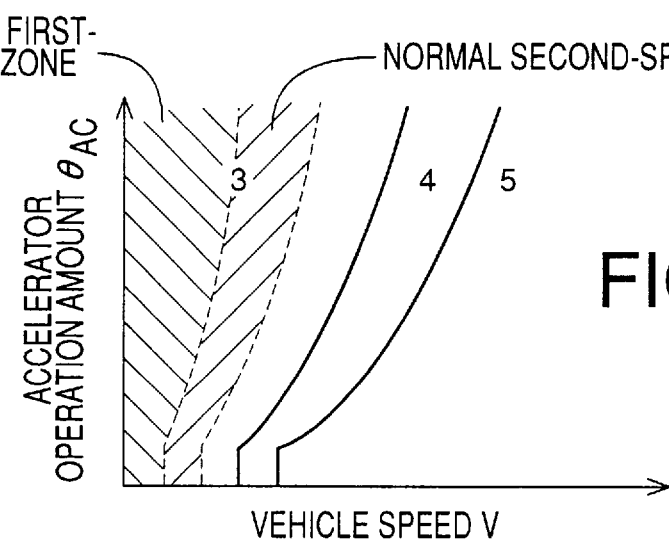

In the first embodiment, the special shift pattern of FIG. 9B used when the second-speed position "2nd" of the automatic transmission 18 cannot be established is formulated to inhibit an operation to shift the automatic transmission 18 to the second-speed position "3rd". However, it is possible to use a special shift pattern as indicated in FIG. 9C which inhibits operations to shift the automatic transmission 18 to the first- and second-speed positions "1st" and "2nd". In this case, the substitute drive power source selecting means should be adapted to select both the engine 12 and the motor/generator 14 as the drive power source upon failure of the transmission 18.

The illustrated embodiments are adapted to control the automatic transmission 18 according to the special shift pattern of FIG. 9B where the second-speed position "2nd" cannot be established or where the oil temperature $T_{OIL}$ of the hydraulic control device 44 is excessively low. However, step SA2 of the routine of FIG. 8 may be eliminated. that is, the special shift pattern is used only when the second-speed position of the automatic transmission 18 cannot be established. Further, the special operating state of the vehicle in which the special shift pattern is used may be suitably selected.

While the special shift patterns of FIG. 9B and FIG. 9C are formulated to establish the third-speed position "3rd" when the vehicle running condition ($\theta_{AC}$, V) falls in the normal second-speed zone (FIG. 9B) or normal first-speed and second-speed zones (FIG. 9C), the entirety of these normal second-speed zone and first- and second-speed zones need not be replaced by the third-speed zone according to the special shift patterns. For instance, the special shift pattern of FIG. 9B may be modified so that the third-speed position is established according to the modified shift pattern when the vehicle running condition is in a portion of the normal second-speed zone indicated by hatching in FIG. 9B.

It is to be understood that the present invention may be embodied with various other changes, modifications and improvements, which may occur to those skilled in the art, in the light of the foregoing teaching.

What is claimed is:

1. A hybrid drive system for a motor vehicle, comprising:
an electric energy storage device for storing an electric energy;
a drive power source including an electric motor operated with the electric energy supplied from said electric energy storage device, and an engine operated by combustion of a fuel, at least one of said electric motor and said engine being operated for driving the motor vehicle in a plurality of operation modes;
an automatic transmission which is disposed between said drive power source and a drive wheel of the motor vehicle and whose speed ratio is variable;
shift control means for controlling said automatic transmission to change its speed ratio, according to a predetermined normal shift pattern determined drive the motor vehicle with an optimum drive force, in a normal operating state of the motor vehicle, and according to a predetermined special shift pattern in a predetermined special operating state of the motor vehicle such that the speed ratio of the automatic transmission controlled according to said special shift pattern is smaller than the speed ratio of the automatic transmission according to said normal shift pattern; and substitute drive power source selecting means for selecting at least said engine as the drive power source for driving the motor vehicle in said predetermined special operating state of the motor vehicle in which said automatic transmission is controlled according to said special shift pattern.

2. A hybrid drive system according to claim 1, wherein said engine has a maximum torque larger than that of said electric motor, and said substitute drive power source selecting means selects only said engine as the drive power source for driving the motor vehicle in said predetermined special operating state.

3. A hybrid drive system according to claim 1, wherein said substitute drive power source selecting means selects both said engine and said electric motor as the drive power source for driving the motor vehicle in said predetermined special operating state.

4. A hybrid drive system according to claim 1, wherein said shift control means controls said automatic transmission according to said special shift pattern where said automatic transmission cannot be normally shifted to any one of drive positions thereof having respective different speed ratios cannot be normally established.

5. A hybrid drive system according to claim 4, wherein said shift control means controls said automatic transmission according to said special shift pattern where any one of said drive positions of said automatic transmission cannot be correctly established due to abnormality associated with the shifting of the automatic transmission.

6. A hybrid drive system according to claim 4, wherein said shift control means controls said automatic transmission according to said special shift pattern where a temperature of an oil used for operating said automatic transmission is lower than a predetermined lower limit.

7. A hybrid drive system according to claim 1, wherein said shift control means controls said automatic transmission according to said special shift pattern where said automatic transmission should be inhibited from being shifted to any one of drive positions thereof having respective different speed ratios.

8. A hybrid drive system according to claim 1, further comprising output increasing means for increasing an output of the drive power source which is selected by said substitute drive power source selecting means in said predetermined special operating state of the motor vehicle, so that the output of said drive power source in said predetermined special operating state is larger than that of said drive power source in said normal operating state.

9. A hybrid drive system according to claim 8, wherein said substitute drive power source selecting means selects both said engine and said electric motor as the drive power source for driving the motor vehicle in said predetermined special operating state, and wherein said output increasing means increases an output of said electric motor in said predetermined special operating state of the motor vehicle.

* * * * *